US006646273B2

(12) United States Patent
Ferralli

(10) Patent No.: US 6,646,273 B2
(45) Date of Patent: Nov. 11, 2003

(54) SUN EXPOSURE AND RADIATION DOSIMETER

(75) Inventor: Michael W. Ferralli, Fairview, PA (US)

(73) Assignee: Sunband, Pittsburgh, PA (US)

( * ) Notice: Subject to any disclaimer, the term of this patent is extended or adjusted under 35 U.S.C. 154(b) by 0 days.

(21) Appl. No.: 09/754,588

(22) Filed: Jan. 4, 2001

(65) Prior Publication Data

US 2002/0084423 A1 Jul. 4, 2002

(51) Int. Cl.[7] ................................. G01T 1/02
(52) U.S. Cl. ..................... 250/474.1; 250/472.1
(58) Field of Search .................. 250/474.1, 472.1, 250/473.1

(56) References Cited

U.S. PATENT DOCUMENTS

| 3,112,200 | A | * | 11/1963 | Wainer ..................... 250/474.1 |
| 3,290,499 | A | * | 12/1966 | Vale et al. ................ 250/474.1 |
| 3,691,380 | A | * | 9/1972 | Hubner et al. ........... 250/474.1 |
| 3,743,846 | A | * | 7/1973 | Matsumoto et al. ........ 250/474 |
| 3,768,976 | A | * | 10/1973 | Hu et al. ...................... 23/254 |
| 3,899,677 | A | * | 8/1975 | Hori et al. ............... 250/474.1 |
| 4,008,085 | A | * | 2/1977 | Lemahieu et al. ............. 96/48 |
| 4,791,155 | A | * | 12/1988 | Gregory et al. ............... 524/22 |
| 5,099,132 | A | * | 3/1992 | Ueno et al. .............. 250/474.1 |
| 5,436,115 | A | * | 7/1995 | Mullis ........................ 430/338 |
| 5,633,584 | A | * | 5/1997 | Maryanskl et al. ......... 324/300 |
| 5,672,465 | A | * | 9/1997 | Patel et al. .................. 430/332 |
| 6,117,626 | A | * | 9/2000 | Yamane et al. ............. 430/509 |
| 2002/0025498 | A1 | * | 2/2002 | Yang et al. ................. 430/620 |

* cited by examiner

Primary Examiner—Constantine Hannaher
Assistant Examiner—Otilia Gabor
(74) Attorney, Agent, or Firm—Cohen & Grigsby, P.C.

(57) ABSTRACT

A radiation dosimeter is described which utilizes the conversion of iodide by impinging ultraviolet or other equal or greater energy radiation in the presence of a thiosulfate moderating agent and the subsequent complexing of the iodine producing by a suitable starch to produce a color variation which is indicative of the amount of such radiation received.

15 Claims, 8 Drawing Sheets

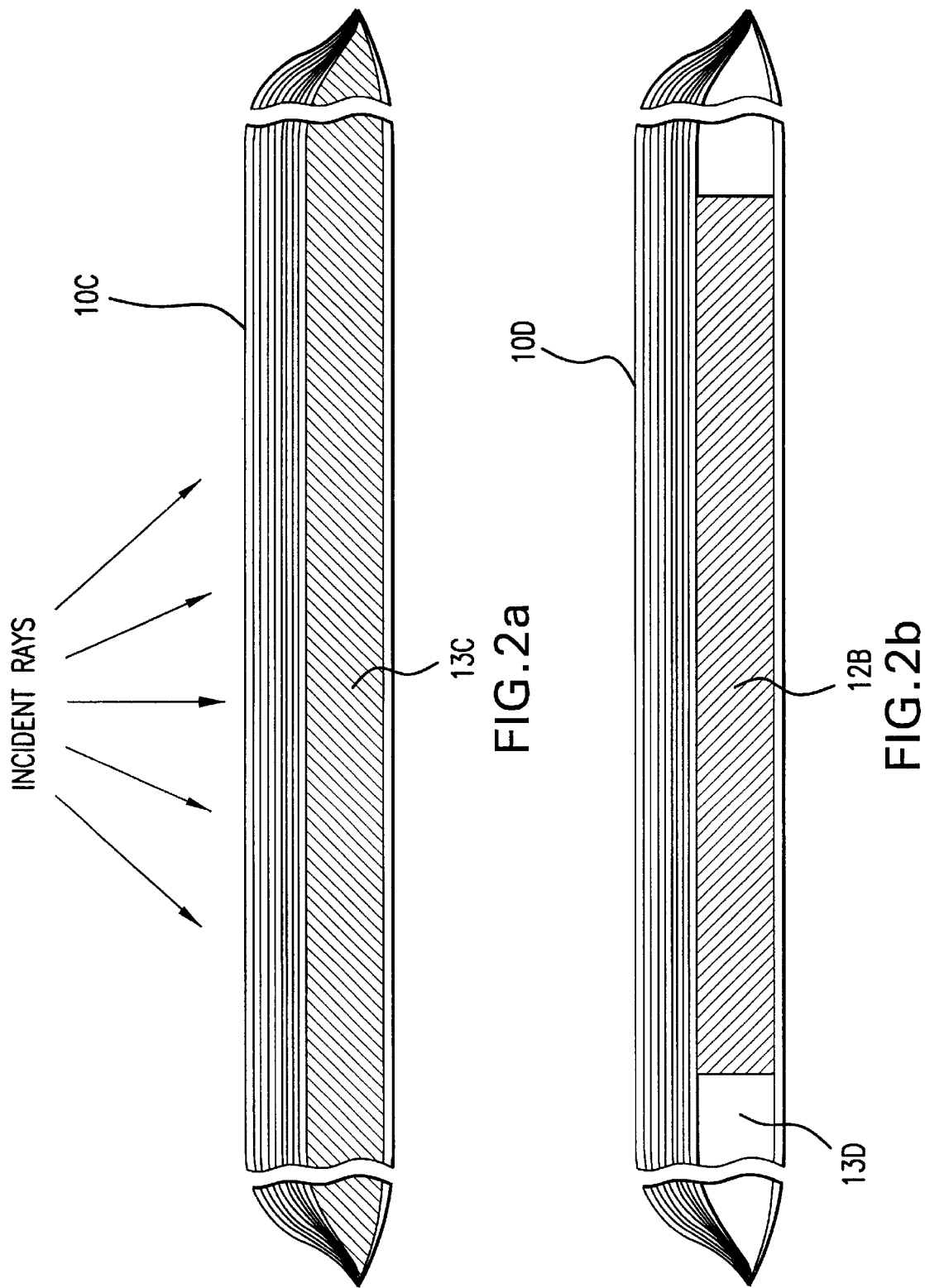

SUN EXPOSURE AND RADIATION DOSIMETER

FIELD OF THE INVENTION

The present invention relates to an improved device and method for determining ultraviolet or other radiation exposure from the sun or other sources.

BACKGROUND OF THE INVENTION

The harmful effects of exposing human and other mammalian skin to the ultraviolet portion of the radiation spectrum has long been known and documented. The harmful rays have been identified as being the spectral range from 290 to 320 nanometers, a region which is outside of the perceptual range of the human eye. The effects of ultraviolet exposure remain largely unpredictable despite recent advances in radiation detection technology, such as the ultraviolet index, because local anomalies in the atmosphere vary the inherent filtering potential in this spectral region. This filtering action depends upon a number of factors including the angle of incidence of the sun's rays, the atmospheric thickness, a person's altitude, cloud cover, and pollution.

Historically people have protected themselves from ultraviolet exposure by using lotions which contain ultraviolet filters. These lotions typically allow the so-called "tanning" radiation, wavelengths from about 320 to 400 nanometers, to penetrate while absorbing burning radiation, wavelengths shorter than 320 nanometers. However, these lotions offer only a fixed degree of protection by effecting a fixed degree of filtration. The degree of filtration cannot be typically be altered except by the purchase of another lotion with more or less filtration. Thus, the person desiring to adequately protect themselves from exposure to ultraviolet radiation must first determine the intensity of ultraviolet radiation emitted at their location. Although the ultraviolet index is useful in this determination, it is not a precise determinant of local ultraviolet radiation intensity. Clearly, an inexpensive ultraviolet dosimeter would be valuable to humans and other ultraviolet radiation sensitive mammals subject to ultraviolet radiation exposure.

There are a number of ultraviolet radiation dosimeters on the market and in the literature. These devices fall into two broad categories: electronic and chemical. The electronic devices typically contain a detecting device, usually equipped with appropriate filters to screen out unwanted electromagnetic radiation, and an amplifier, an electronic integrator, and display. Although such devices can be reasonably accurate, they are inherently complex, considering the electronic manipulation they must perform in order to display the desired result. Despite the tremendous advances in electronics, these devices remain relatively expensive and are typically beyond a price the public is willing to pay for the information the device generates. Furthermore, these electronic devices are subject to failure and damage due to misuse and inherent flaws.

The chemical devices typically undergo a reversible or irreversible color change initiated by incident ultraviolet radiation. These chemicals are designed to change structurally or chemically react when exposed to incident ultraviolet radiation. These chemicals, having been custom designed for a particular use, are not typically easy to manufacture, may exhibit long term harmful effects if they contact mammalian tissue, are difficult to calibrate, and cannot easily be altered to account for the ultraviolet susceptibility of different individuals—typically fair-skinned individuals are more likely to experience tissue damage due to a given dose of ultraviolet radiation than are dark-skinned individuals. These devices may also require matching to particular reference colors in order to establish ultraviolet radiation exposure and thus are flawed due to the inherent differences in individuals' color-matching abilities.

Furthermore, the present inventions are described as having sensitivity only in the context of ultraviolet radiation as emitted by the sun, whereas the general nature of the invention described below allows it to be easily adapted to any radiation, such as X-Rays and Beta emissions, which will initiate the chemical reactions described therein.

SUMMARY OF THE INVENTION

The present invention overcomes the problems inherent in ultraviolet radiation dosimeter devices presently on the market or described in the literature by incorporating a simple, easily controlled chemical reaction of well known, inexpensive common chemicals which have minimal harmful properties. Generally, the invention comprises a device that permits ultraviolet radiation to penetrate and convert a mixture to change color to provide an indication that ultraviolet radiation has impinged the device. In a presently preferred embodiment, the mixture comprises iodide, $I^-$, which is converted to Iodine, preferably utilizing thiosulfate to convert iodine back to iodide, such that when the thiosulfate is depleted the iodine is complexed with starch to form a characteristically brown-colored starch-complexed iodine.

In the preferred embodiment, the rate at which the starch-complexed iodine is formed is adjusted by the amount of thiosulfate present. Thus, the time for coloration of an otherwise clear, typically, water-based solution can be extended by the addition of thiosulfate. In the preferred embodiment, potassium iodide is mixed with cornstarch, and preferably sodium thiosulfate. The preferred embodiment of the solution gives an approximately 8 Normal solution of potassium iodide in a 5% by mass solution of corn starch to which sufficient sodium thiosulfate is added to remove any non-ionic iodine, typically less than 10 micrograms sodium thiosulfate per 50 ml water herein called the solution. In the preferred embodiment of the device, this solution is optionally mixed with equal parts of liquid latex or other water-dispersed, curable, polymeric agent. The uncured polymeric agent disperses within the solution and when cured forms a matrix which inhibits the evaporation of water while allowing the transmission of ultraviolet radiation. Optionally, in a preferred embodiment approximately 2% by weight of Calcium chloride is added as a humidicant to retain and stabilize the moisture content of the cured material as described below. Other humidicants may be added to achieve the same purpose.

When the mixture is applied to a suitable strip of paper, polymer or other suitable surface, including skin, allowed to cure, and exposed to ultraviolet radiation, it gradually darkens to a brown hue. The rate of darkening is controlled by the amount of thiosulfate added to the solution. The rate of darkening can be adjusted for differences in exposure tolerance exhibited by individuals with varied skin susceptibility. Furthermore, the cured material may be applied to a surface which may incorporate calibrated brown hue references to establish the degree of ultraviolet exposure by simple matching of hue rather than color. Additionally, a humidicant may be added to the solution in order to enhance retention of water in the solution. Other advantages of the invention will become apparent from a perusal of the following detailed description of presently preferred embodiments taken in connection with the drawings which illustrate various carrier mechanisms for use of the invention.

BRIEF DESCRIPTION OF DRAWINGS

FIG. 2a is a cutaway view of the present invention showing multiple layers of polymer sheets facing a source of radiation.

FIG. 2b is a cutaway view of the preferred embodiment of the present invention showing multiple layers of polymer sheets facing a source of radiation.

DETAILED DESCRIPTION OF THE DRAWINGS

Figure 1A:
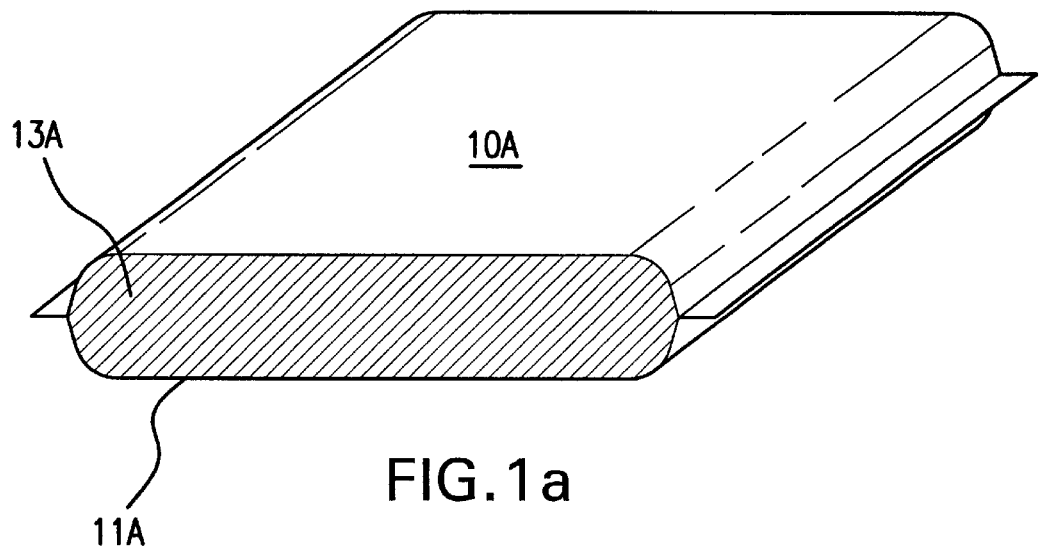
FIG. 1a is a cutaway view of the present invention showing one embodiment thereof.

FIG. 1a shows a cutaway view of a radiation indicator 13A comprising a cured polymeric matrix 10A through which is diffused solution 10B. Solution 10B comprises a halide such as iodine or bromine, a radiation-sensitive polymer such as starch, an optional preservative such as sodium thiosulfate, and a solvent. This solution is preferably uniformly dispersed through polymeric matrix 10A.

Figure 1B:
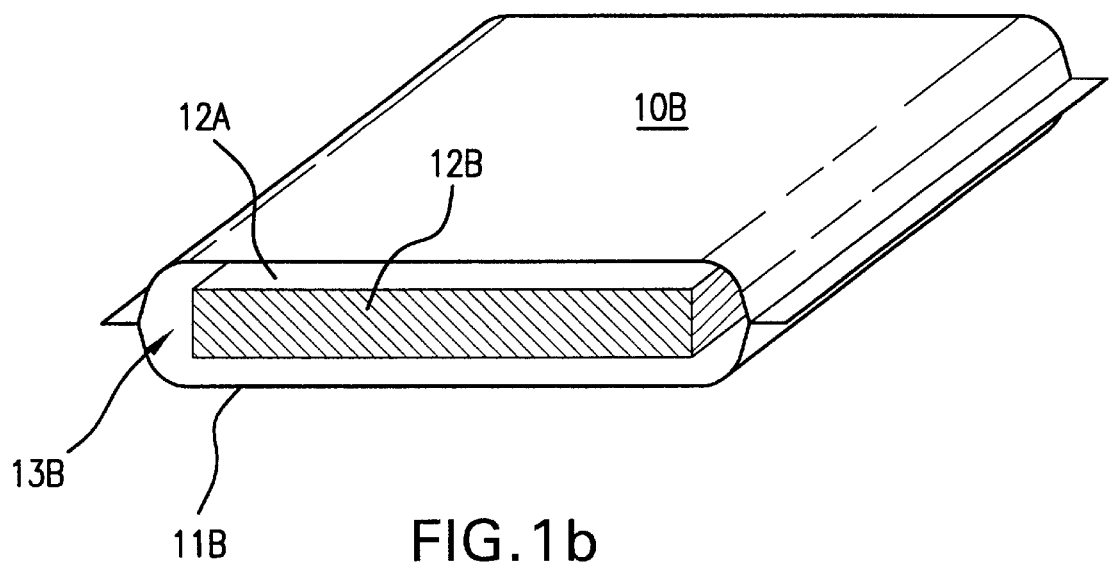
FIG. 1b is a cutaway view of a present invention showing the preferred embodiment thereof.

FIG. 1b shows a cutaway of radiation indicator 13B comprising a first polymeric strip 10B attached at its circumference to a second polymer sheet 11B. In this embodiment, a porous strip 12A is saturated with the solution 12B represented by the diagonal lines. The polymer sheets in FIG. 1b may be selected from polypropylene, polyethylene, polyvinylchloride, or any combination thereof. Moreover, the polymer sheets may be of any thickness selected to transmit a predetermined amount of radiation.

Figure 3:
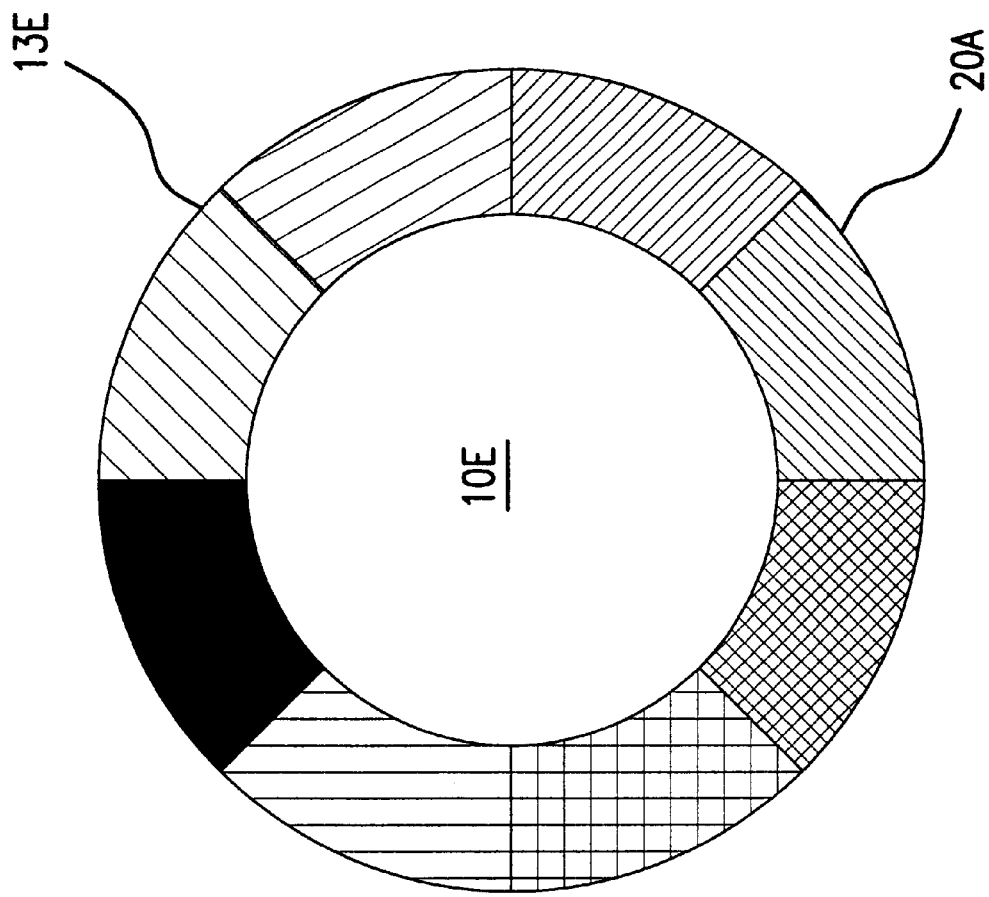
FIG. 3 is a top view of the invention illustrating the potential for matching the characteristic color hue of the starch-complexed iodine in order to determine exposure.

FIG. 2a shows a cutaway of radiation indicator 13C comprising a plurality of polymer sheets on the surface of radiation indicator 13C designated to face incident radiation. The number of polymer sheets represented by 10C used in the present invention is determined by calculating the amount of radiation desired to be transmitted through the polymer sheets to the solution represented by the diagonal lines. FIG. 2b shows a cutaway of the preferred embodiment of radiation indicator 13D using a plurality of polymer sheets 10D on the surface of the radiation indicator 13D designated to face incident radiation. Porous strip 12B is saturated in the solution represented by the diagonal lines. The number of polymer sheets used in the preferred embodiment is determined by calculating the amount of radiation desired to be transmitted through the polymer sheets to the starch/iodide mixture. Moreover, the each sheet may be comprised of multiple materials, or sheets made of different materials may be layered together to adjust the amount of radiation desired to transmit through. In addition the amount of uncured polymer added to the solution can also be used to adjust the amount of radiation striking the solution FIG. 3 shows an embodiment of a calibrated background or foreground reference 20A comprising distinct color hues representing the amount of radiation exposed to the window 10E. The window 10E surface designated to face incident radiation is equivalent to polymer sheet 10A or 11A in FIG. 1a, polymer sheet 10B or 11B in FIG. 1b, the plurality of polymer sheets of designated surface 10C in FIG. 2a and the plurality of polymer sheets of designated surface 10D in FIG. 2b. The rate of color hue change of the solution in radiation indicator 13E is calibrated to darken at a predetermined rate by selecting a predetermined thickness or number of polymer sheets, a predetermined concentration of reactants in the starch/iodide mixture, or any combination thereof. The color hue references representing the amount of incident radiation reaching the solution in this embodiment are shown as eight distinct color hues from lightest to darkest. Other embodiments may use a greater or lesser number of distinct color hues, or a continuous spectrum of hues. The reference hues may be created on any medium capable of displaying the color hue. Furthermore, the reference hues may be displayed by any shape capable of accurately displaying the color hue. FIG. 3 is not meant to limit other possible embodiments of this invention, but only provide one example of the principle of operation.

Figure 4:
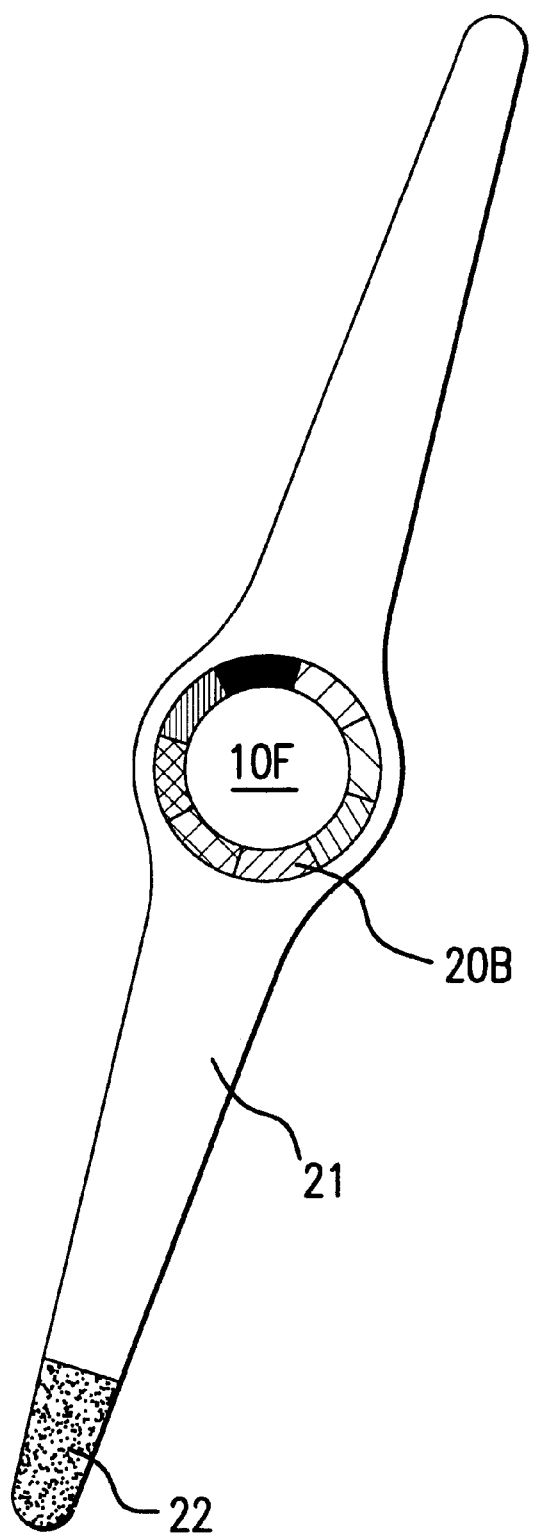
FIG. 4 is a top view of the invention illustrating the potential for matching the characteristic color hue of the starch-complexed iodine in order to determine exposure, and means to attach it to any object exposed to radiation, but especially a mammalian limb.

FIG. 4 shows the embodiment of FIG. 3 attached to a strip 21 with fastening means 22 so that it may form a circle. The strip 21 may be made of polypropylene, polyethylene, polyvinylchloride, or any other material capable of displaying window 10F and calibrated background or foreground 20B. Fastening means 22 may be made of an adhesive, Velcro®, snap fasteners, or any other means for attaching the fastening means end to another part of strip 21 to form a circle.

Figure 5:
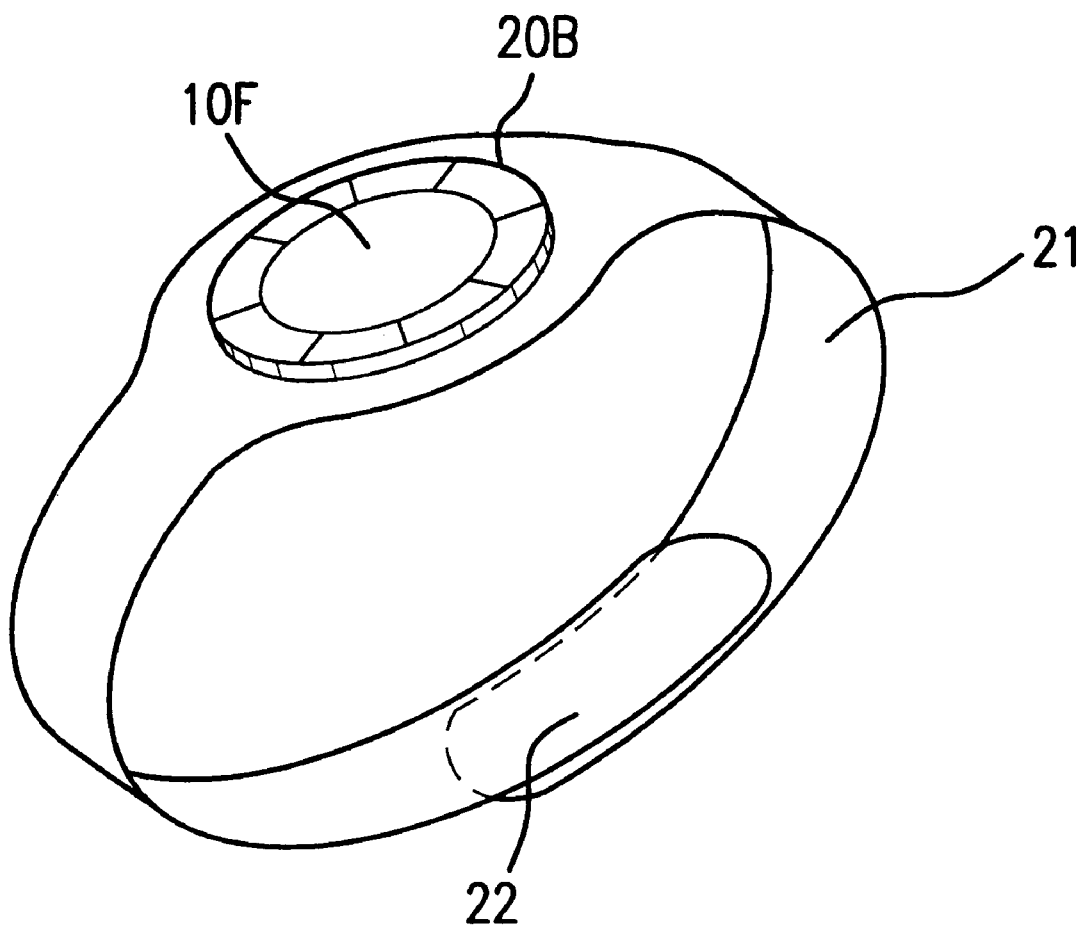
FIG. 5 is a three-dimensional view of the present invention with means for attachment to any object exposed to radiation, but especially a mammalian limb.

FIG. 5 shows the preferred embodiment of FIG. 4 with fastening end 22 engaged. In the preferred embodiment, window 10F should generally be exposed in a direction toward a radiation source.

Figure 6A:
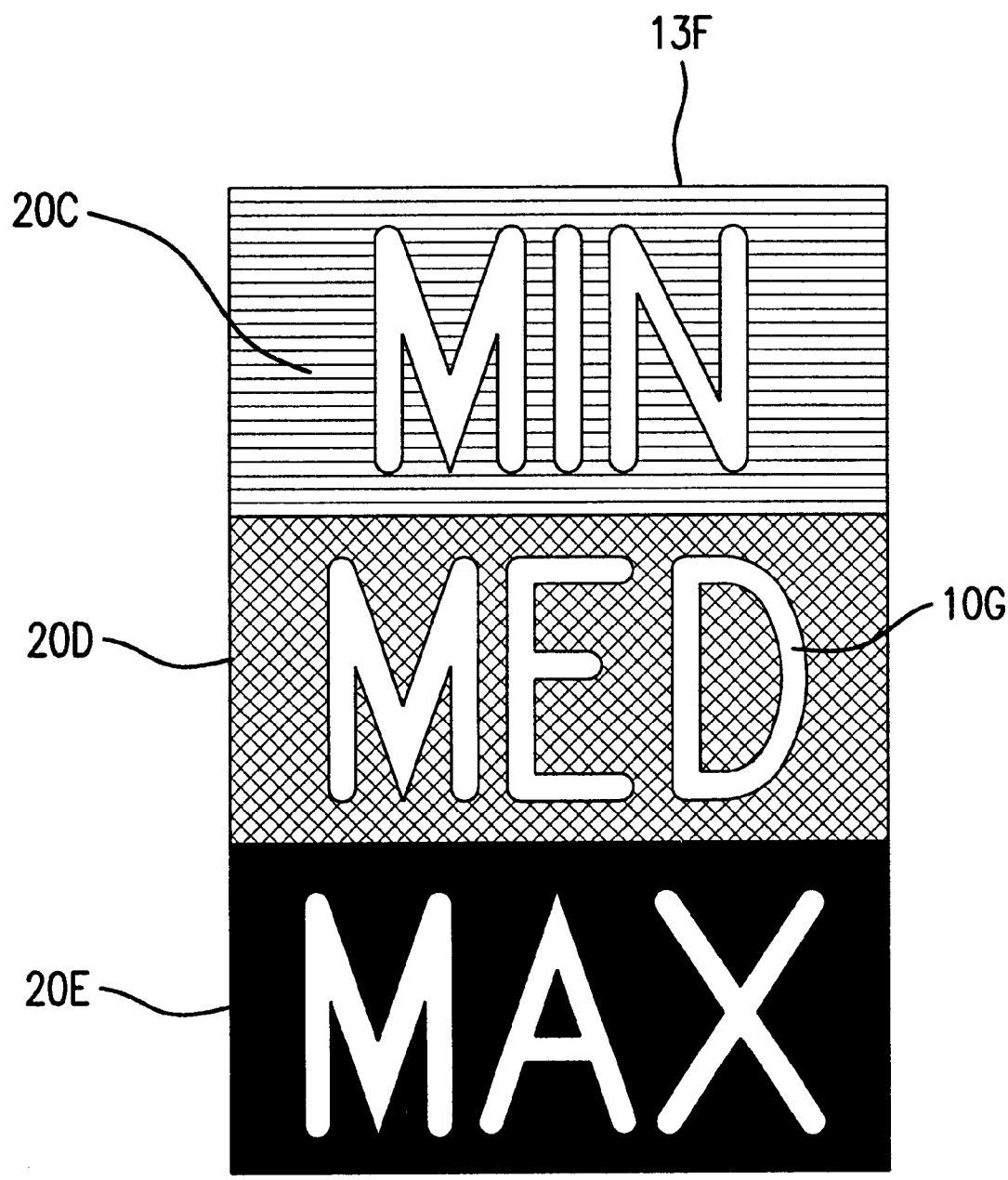
FIG. 6a is a top view of the invention illustrating the potential for developing word perception using the distinction of the color hue of the starch-complexed iodine with respect to letter-shaped windows.

FIG. 6a shows a top view of the invention using the distinct color hue of the solution as seen through windows 10G shaped in the form of letters. In FIG. 6a, foreground or background 20C is a color hue reference matching the color hue of a predetermined starch/iodide mixture at a relatively short exposure to radiation. In addition, foreground or background 20D and 20E are color hues that are progressively darker to match the solution at longer radiation exposures. In this embodiment, radiation indicator 13F is one continuous Radiation indicator with one concentration of starch/iodide mixture reactants throughout. As the solution is exposed over time to a radiation source, and as the mixture begins to darken, the color hue of the letter-shaped windows will begin to match the background or foreground reference color hue. At the point that the color hue of the starch/iodide mixture matches the background or foreground reference color hue, it will appear that the word "MIN" becomes less distinguishable. At this point, an observer may determine that the amount of radiation exposed to the solution is equal to the predetermined amount represented by the reference color hue.

Upon further exposure, the solution will continue to darken, and eventually match the color of background or foreground 20D. At this point, the starch/iodide complex will be darker than background or foreground 20C, thus displaying to the ordinary observer that the starch/iodide has been exposed to more than the predetermined "MIN" amount of radiation. Also at this point, the word "MED" will become less distinguishable, thus displaying that the starch/iodide complex has been exposed to the predetermined "MED" amount of radiation.

Figure 6B:
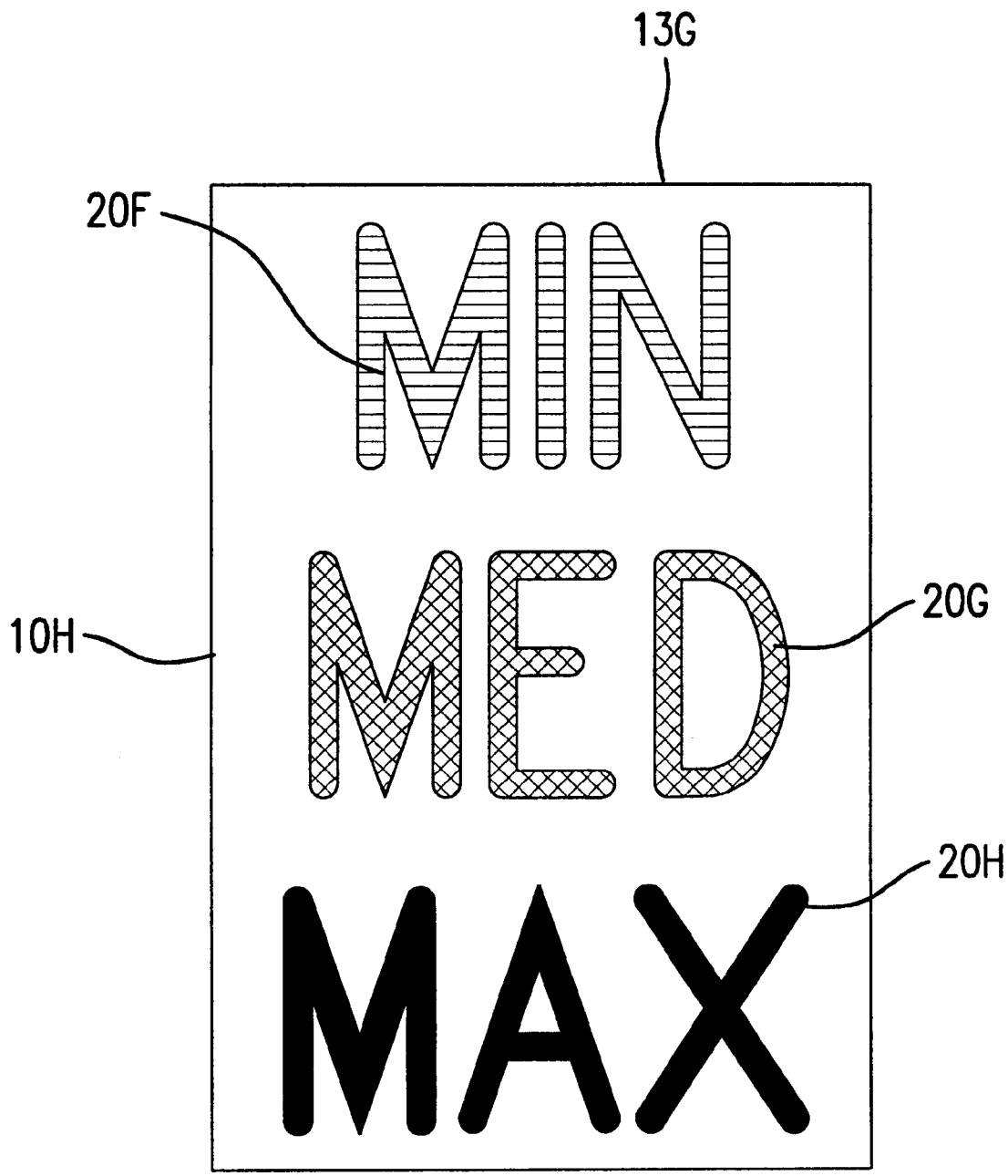
FIG. 6b is a top view of the invention illustrating the potential for developing word perception using the distinction of the color hue of the starch-complexed iodine with respect to solid letter shapes encompassed by a window.

Upon subsequent exposure, the words "MED" and "MAX" will also become less distinguishable, displaying that the starch/iodide complex has been exposed to other predetermined levels of radiation. However, FIG. 6a in only one embodiment of the present invention, and should not be construed to limit the invention to use the words "MIN," "MED" and "MAX." Any words may be used, and any number of predetermined color hues may be used in this embodiment. Furthermore, any symbol may be used to display that the starch/iodide mixture has been exposed to a predetermined radiation level. FIG. 6b shows substantially the inverse concept shown in FIG. 6a where the window in FIG. 6b replaces the background or foreground of 6a, and vice versa. Thus, windows 10H display the darkening starch/iodide mixture, and words "MIN," 20F having a light color hue, "MED", 20G having a medium color hue, and "MAX", 20H having a dark color hue, become less distinguishable in order of increasing exposure of the starch/iodide mixture to radiation. Again, FIG. 6b is only one embodiment of the present invention, and does not limit the present invention to the words "MIN," "MED" and "MAX." Furthermore, any number of words or symbols may be used in any order, and in any number.

Figure 6C:
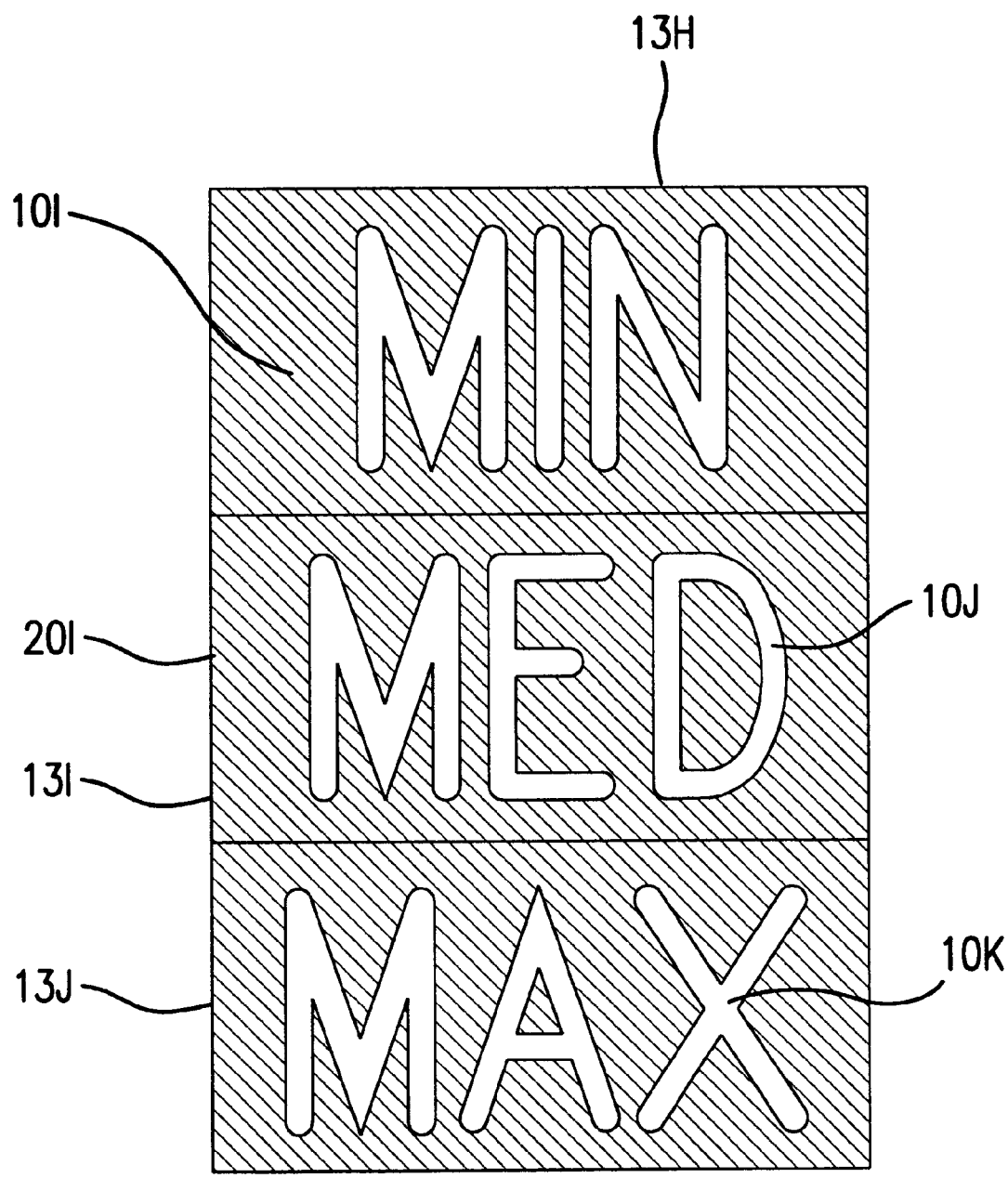
FIG. 6c is a top view of the invention illustrating the potential for developing word perception using different concentrations of reactants and the distinction of the color hue of the starch-complexed iodine with respect to multiple radiation indicators reacting to radiation exposure at different speeds and a solid reference color with letter-shaped windows.

FIG. 6c shows three separate radiation indicators 13H, 13I, and 13J, used in conjunction to display that the solution diffused in each indicator has been exposed to radiation. In the embodiment of FIG. 6c, foreground or background 201 is a solid color hue in contact with part of radiation indicators 13H, 13I, and 13J. In this embodiment, the color hue matches the lightest color hue the starch/iodide complex may take at a minimum amount of exposure. Upon exposure to radiation, each indicator darkens at a different rate to reveal words at different exposures. The rates of starch/iodide darkening may be adjusted using different concentrations of reactants, different amounts of uncured polymeric agent, differing polymer sheet materials, differing thicknesses of polymer sheets, using a plurality of polymer sheets, or any combination thereof.

In this embodiment, radiation indicator 13H comprises a solution that reacts with radiation at a rate faster than that of radiation indicator 13I, and the solution of indicator 13I subsequently has a reaction rate faster than that of the starch/iodide mixture of indicator 13J. Thus, as the three indicators are exposed to a radiation source, indicator 13H will darken quicker than indicator 13I, and 13I will darken quicker than indicator 13J. Subsequently, the word "MIN" will become apparent at a predetermined radiation exposure when the starch/iodide mixture darkens beyond the reference color hue. As the three radiation indicators continue to be exposed, the word "MED" will become apparent with longer radiation exposure. Finally, the word "MAX" will become apparent when the slowest reacting radiation indicator 13J has been exposed to a predetermined amount of radiation.

Again, FIG. 6c is only one embodiment of the present invention, and is not limited to the words "MIN," "MED" or "MAX." Furthermore, any symbol that may communicate that at predetermined radiation exposure has been reached may be used. Moreover, a dark reference color hue may be used as a background or foreground to display the amount of exposure by the letters or symbols becoming less distinguishable. Overall, each Figure shows a simple embodiment that does not limit other embodiments of this invention. Any number of radiation indicators used in conjunction may be used in this manner to display radiation exposure levels. Moreover, any thickness, number of polymer sheets, any polymer sheet material, any suitable humidicant, and any concentrations of starch/iodide reactants may be used to adjust the speed with which the starch/iodide mixture darkens and appears through a window. This embodiment may also have a means of attaching the radiation indicators to an object exposed to radiation, but especially a mammalian limb.

Presently Preferred Embodiment

In the preferred embodiment, an 8 Normal solution of potassium iodide containing 5% by mass corn starch to which sufficient sodium thiosulfate is added to remove any non-ionic iodine as observed by a color change from a yellow solution to a clear solution, typically less than 10 micrograms sodium thiosulfate per 50 milliliters water. This solution is mixed with uncured liquid latex and adsorbed on a sheet of Tyvek® material, allowed to cure and then cut into strips. Tyvek® protective material includes a family of durable spunbonded olefin sheet products made from high density polyethylene fibers available from DuPont. This manufacturing operation should be undertaken in the absence of ultraviolet light to avoid initiating the chemical response of the device.

In testing, the dimensions of the strips were 3 cm by 30 cm strips approximately 0.1 mm thick. When exposed to direct sunlight at approximately noon during the summer in Erie, Pa., the strip was observed to commence darkening in about 45 minutes. The darkening was observed to be complete with full darkening occurring after approximately 3 hours. It was observed that the initiation of darkening could be delayed or advanced by the addition or subtraction of the amount of sodium thiosulfate used in the solution with the full advancement of darkening initiation being achieved with the elimination of sodium thiosulfate. It was also observed that the rate of darkening could be varied by selection of various amounts of uncured latex of polyethylene which act to partially absorb the ultraviolet radiation. The rate of darkening could also be adjusted by using different polymers with varying ultraviolet absorption values in place of or in combination with polyethylene. It was also observed that any radiation impinging on the strip which was capable of converting the Iodide ion to Iodine would trigger the darkening sequence. It was thus noted that the strip was capable of determining the dose of X rays, Gamma rays, and other radiation including radiation triggered by the decay of Radon or other such radioactive species which would act to either directly or indirectly produce energy in the form which would act to convert the Iodide Ion to Iodine. It was further noted that any negative iodide ion formed from any compound could be used and the Potassium Iodide was used simply as an example of the mechanism of producing an iodide ion. It was also noted that any thiosulfate could be used as well as any starch provided that these compounds would act in substantially the same manner as sodium thiosulfate and cornstarch respectively. It was further noted that considering the different energy level required to convert a bromide ion to bromine, the bromide compounds could also be used as a dosimeter device albeit for those radiating species which have sufficient energy to convert bromide ions to bromide.

While the invention has been described in connection with what is presently considered to be the preferred embodiment, it is to be understood the invention is not to be limited to the disclosed embodiments, but on the contrary is intended to cover various modifications and equivalent arrangements included within the spirit of the scope of the appended claims. The principle of operation of the dosimeter described herein could be used to determine the dose of X-rays, radon, gamma-rays, and other radiation whether directly electromagnetic in nature or not.

While presently preferred embodiments of the invention have been shown and describe in particularity, the invention may be otherwise embodied within the scope of the appended claims.

What is claimed is:

1. A radiation indicator comprising a radiation transmissive member for containing a mixture and a mixture comprising:
   (a) a halide compound containing a halogen functionality selected from iodine and bromine;
   (b) a polysaccharide; and
   (c) a solvent sufficient to dissolve said halide compound and polysaccharide.

2. The radiation indicator of claim 1 wherein said mixture is contained on a porous strip.

3. The radiation indicator of claim 2 wherein said strip comprises polyethylene.

4. The radiation indicator of claim 1 wherein said polysaccharide has at least one 1,4'-alpha-glycoside bond or at least one 1,6'-alpha-glycoside bond.

5. The radiation indicator of claim 1 wherein said mixture includes a humidicant.

6. The radiation indicator of claim 1, wherein said polysaccharide is starch.

7. The radiation indicator of claim 6 wherein the starch is selected from cornstarch, amylose subunits, amylopectin, maltose, or any combination thereof.

8. The radiation indicator of claim 1 including a first polymer sheet sealed to a second polymeric sheet wherein said mixture is sealed therebetween.

9. The radiation indicator of claim 8 wherein the first polymer sheet and second polymer sheet are comprised of at least one material selected from the group consisting of polypropylene, polyethylene, and polyvinylchloride.

10. The radiation indicator of claim 1 wherein said mixture includes sodium thiosulfate.

11. A radiation indicator comprising a pair of strips sealed together having a mixture therebetween, said mixture comprising an aqueous solution of potassium iodide having about 1 to 5% by weight corn starch and, sodium thiosulfate in sufficient amount to remove nonionic iodine.

12. The radiation indicator of claim 11 wherein said mixture includes a humidicant and said strips comprise olefin sheet or polyethlene fiber.

13. The radiation indicator of claim 12 wherein said humidicant is calcium chloride.

14. The radiation indicator of claim 12 wherein said mixture includes liquid latex.

15. A radiation indicator comprising at least one radiation transmissive member for containing a mixture and a mixture comprising:
   (a) a halide compound containing a halogen functionality selected from iodine and bromine;
   (b) a starch; and
   (c) a solvent sufficient to dissolve said halide compound and starch.

* * * * *